(12) United States Patent
Wu

(10) Patent No.: US 12,279,169 B2
(45) Date of Patent: Apr. 15, 2025

(54) HANDOVER DURING SECONDARY CELL GROUP FAILURE

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 522 days.

(21) Appl. No.: 17/599,508

(22) PCT Filed: Mar. 28, 2020

(86) PCT No.: PCT/US2020/025584
§ 371 (c)(1),
(2) Date: Sep. 28, 2021

(87) PCT Pub. No.: WO2020/198723
PCT Pub. Date: Oct. 1, 2020

(65) Prior Publication Data
US 2022/0150774 A1 May 12, 2022

Related U.S. Application Data

(60) Provisional application No. 62/827,793, filed on Apr. 1, 2019, provisional application No. 62/825,600, filed on Mar. 28, 2019.

(51) Int. Cl.
*H04W 36/00* (2009.01)
(52) U.S. Cl.
CPC ... *H04W 36/0079* (2018.08); *H04W 36/0058* (2018.08); *H04W 36/0072* (2013.01); *H04W 36/0069* (2018.08)

(58) Field of Classification Search
CPC ......... H94W 36/0069; H04W 36/0079; H04W 36/0058; H04W 36/0072
See application file for complete search history.

(56) References Cited

U.S. PATENT DOCUMENTS

2014/0293958 A1* 10/2014 Teyeb ............... H04W 36/0064
370/331
2016/0212753 A1  7/2016 Wu
(Continued)

FOREIGN PATENT DOCUMENTS

| CN | 108990116 A | 12/2018 |
|---|---|---|
| EP | 3 051 916 A1 | 8/2016 |
| WO | WO-2018/182231 A1 | 10/2018 |

OTHER PUBLICATIONS

"3rd Generation Partnership Project; Technical Specification Group Radio Access Network; NR-RAN; Architecture Description (Release 15)," 3GPP Draft (2019).
(Continued)

*Primary Examiner* — Walter J Divito
(74) *Attorney, Agent, or Firm* — MARSHALL, GERSTEIN & BORUN LLP

(57) ABSTRACT

A user device operating in dual-mode connectivity with a master node and a secondary node detects a failure of a secondary cell group associated with the secondary node (1104). In response, the user device suspends an secondary cell group transmission (1106). The user device generates a message related to a status of the SCG for transmission to the MN (1108) and transmitting the message to the MN when the SCG transmission is suspended (1110).

19 Claims, 11 Drawing Sheets

(56) References Cited

U.S. PATENT DOCUMENTS

| | | | |
|---|---|---|---|
| 2017/0099621 A1* | 4/2017 | Michaelsen | H04W 36/0033 |
| 2017/0215185 A1 | 7/2017 | Fukuta et al. | |
| 2017/0222876 A1 | 8/2017 | Van Der Velde et al. | |
| 2019/0090144 A1* | 3/2019 | Wu | H04L 5/0098 |
| 2020/0029259 A1* | 1/2020 | Yiu | H04W 74/006 |
| 2020/0053616 A1* | 2/2020 | Zhu | H04W 36/14 |
| 2020/0154333 A1* | 5/2020 | Paladugu | H04B 7/0602 |
| 2024/0129983 A1* | 4/2024 | Yilmaz | H04W 76/27 |

OTHER PUBLICATIONS

"3rd Generation Partnership Project; Technical Specification Group Radio Access Network; NR; NR and NG-RAN Overall Description; Stage 2 (Release 15)," 3GPP Draft (2019).

"3rd Generation Partnership Project; Technical Specification Group Radio Access Network; NR; Radio Resource Control (RRC) Protocol Specification (Release 15)," 3GPP Draft (2019).

"3rd Generation Partnership Project; Technical Specification Group Services and System Aspects; Procedures for the 5G System; Stage 2 (Release 15)," 3GPP Draft (2019).

CATT, "Consideration on Supporting Local LMF in NR Positioning R16" 3GPP TSG RAN WGB Meeting 3104 (2018).

China Mobile, "Local network exposure with LLMF," SA WG2 Meeting #129bis (2018).

Huawei, "CR on supporting signaling only connection ," 3GPP TSG-RAN WG2 104 (2018).

Huawei, "Update of Solution 4 'Positioning operations considering different LMF deployment scenarios'," SA WG2 Meeting #127bis (2018).

International Search Report and Written Opinion for Application No. PCT/US2020/025584, dated Jul. 1, 2020.

Rapporteur, "Agreements for MR-DC with 5GC," 3GPP TSG-RAN WG2 Meeting #104 (2018).

First Chinese Office Action for Application No. 202080039954.7, dated Nov. 18, 2023.

* cited by examiner

HANDOVER DURING SECONDARY CELL GROUP FAILURE

FIELD OF THE DISCLOSURE

This disclosure relates generally to wireless communications and, more particularly, to handling handover in dual connectivity (DC) when a cell group associated with the secondary node fails.

BACKGROUND

A user device (or user equipment, commonly denoted by acronym "UE") in some cases can operate in DC with a master node (MN) and a secondary node (SN). The MN can provide a control plane connection and a user plane connection to a core network (CN), whereas the SN generally provides a user plane connection. The cells associated with the MN define a master cell group (MCG), and the cells associated with the SN define a secondary cell group (SCG).

The UE and the base stations MN and SN can use signaling radio bearers (SRBs) to exchange radio link control (RRC) messages, as well as non-access stratum (NAS) messages. There are several types of SRBs that UEs can use when operating in DC, known as SRB0, SRB1, etc. resources. SRB0 resources support RRC messages over the common control channel (CCCH); SRB1 resources carry RRC messages, which in some cases include non-access stratum (NAS) messages over the dedicated control channel (DCCH); SRB2 resources support RRC messages that include logged measurement information or NAS messages, also over the DCCH but with lower priority than SRB1 resources; SRB3 resources support RRC messages related to measurement configuration and reporting, for example, of an SCG when the UE operates in DC; and SRB4 resources support RRC messages that include application layer measurement reporting information, over the DCCH.

Generally speaking, SRB1 and SRB2 resources allow the UE and the MN to exchange RRC messages related to the MN, and to embed RRC messages related to the SN, and can be referred to as MCG SRBs. SRB3 resources allow the UE and the SN to exchange RRC messages related to the SN, and can be referred to as SCG SRBs. Further, split SRBs allow the UE to exchange RRC messages directly with the MN and the SN. Still further, the UE and the base stations MN and SN use data radio bearers (DRBs) to transport data on a user plane. DRBs that terminate at the MN and use lower-layer resources of only the MN can be referred as MCG DRBs, DRBs that terminate at the SN and use lower-layer resources of only the SN can be referred as SCG DRBs, and DRBs that terminate at either the MCG or the SCG but use lower-layer resources of both the MN and the SN can be referred to as split DRBs.

After an MN provides a UE with SCG configuration, the UE can detect SCG failure (which can be a radio link failure (RLF), for example). In some scenarios, the SCG failure prevents the MN from coordinating a handover procedure for the UE, when a better signal quality or signal strength is available.

SUMMARY

The techniques of this disclosure allow a base station to initiate a handover of a UE after determining that a UE has detected SCG failure and suspended a DRB due to the SCG failure. The base station in different scenarios initiates a handover from one cell of a base station to another cell of the same base station, one DU of a disaggregated base station to another DU of the same disaggregated base station, or one base station to another base station. In the latter case, the base station can initiate the handover using the core network (CN) or without using the CN.

More particularly, a first base station communicating with a UE on a serving cell first can determine that a UE receives a signal of certain strength and/or quality from a second base station and, in response, configure the UE with an SCG and a DRB for communicating with the MN (i.e., the first base station) and SN (i.e., the second base station) in DC. While operating in DC, the UE measures the signal strength and/or quality for the MCG and the SCG and, additionally, may measure the strength and/or quality of at least one downlink carrier of other base stations. In an example scenario, the UE detects SCG failure and suspends the DRB over which the UE communicates data with the SN. The UE notifies the base station of the SCG failure by transmitting a SCG failure indication to the first base station. In some cases, the UE provides to the first base station at least one measurement result which indicates the signal strength and/or quality for at least one downlink carrier or at least one cell. The UE can provide the first base station the at least one measurement result along with the SCG failure indication, or in one or more measurement report prior to the SCG failure indication or after the SCG failure indication, for example.

When the first base station determines that the UE receives better signal quality and/or signal strength at a downlink carrier of at least one other carrier or cell according to one or more measurement results, the base station initiates a handover procedure for the UE even though the DRB is suspended as indicated in the SCG failure indication. Depending on the scenario, the base station can hand over the UE to the first cell or a second cell operated on the downlink carrier. The serving cell, the first cell or the second cell may belong to the same DU or different DUs, and can belong to the first base station or to different base stations (e.g., the first base station and a third base station) that use the same radio access technology (RAT) or different RATs. In one example, the UE and the first base station use a first RAT to communicate with each other before the handover. The downlink carrier may be the first RAT downlink carrier or a second RAT downlink carrier. The first RAT can be fifth generation (5G) new radio (NR) and the second RAT can be Evolved Universal Terrestrial Radio Access (E-UTRA), for example.

In some cases, the base station additionally checks certain conditions to determine whether the base station should allow the handover procedure when the DRB is suspended. In one such implementation, the base station checks whether the UE reports the SCG failure in a dedicated RRC message or reports an MCG failure in a message defined for reestablishing a radio connection. In another implementation, the base station checks the reason for DRB suspension and allows the handover if the UE suspended the DRBs due to the SCG failure. In yet another implementation, the base station checks whether the UE suspended all of the DRBs, and whether any of the suspended DRBs are split DRBs or MCG DRBs.

One example embodiment of these techniques is a method for performing a handover procedure, which can be executed by processing hardware in a base station that operates as an MN. The method includes configuring a UE that operates in DC with the MN and an SN with a DRB associated with an SCG of the SN. The method further includes determining that the DRB has been suspended, determining that a handover procedure should be performed for the UE, and initiating the handover procedure when the DRB is suspended.

Another example embodiment of these techniques is a base station with hardware configured to execute the method above.

Yet another example embodiment of these techniques is a method for performing a handover procedure. The method can be implemented in a UE operating in DC with an MN and an SN. The method can be executed by processing hardware and includes steps such as obtaining a DRB associated with an SCG of the SN; determining a failure of the SCG; in response to the failure, suspending the DRB; transmitting an indication of the failure to the MN; and performing a handover procedure when the DRB is suspended.

Still another example embodiment of these techniques is a UE with hardware configured to execute the method above.

DETAILED DESCRIPTION OF THE DRAWINGS

Figure 1A:
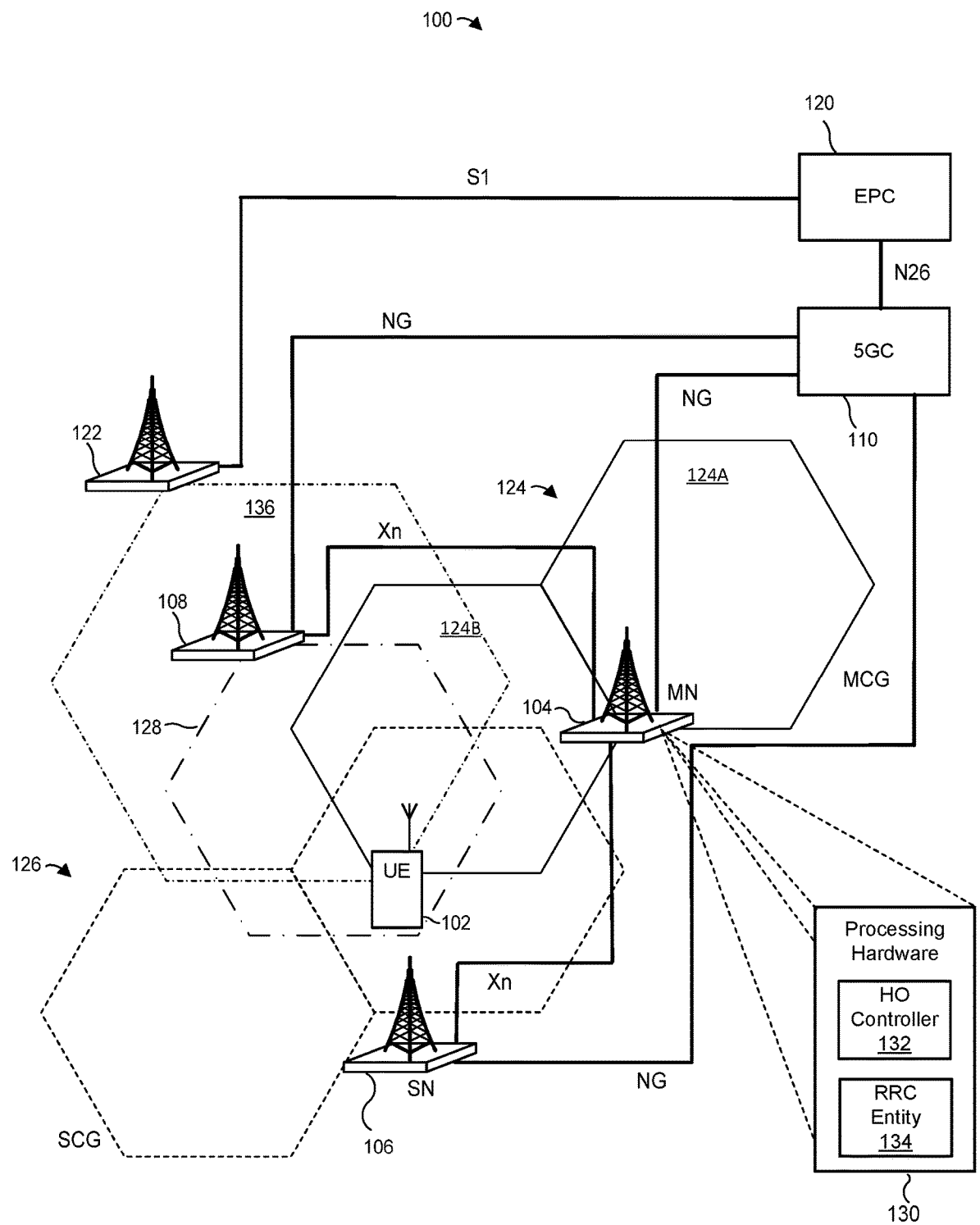
FIG. 1A is a block diagram of an example wireless communication network in which a UE operates in dual connectivity with a master node and a secondary node, and the base station supports a handover procedure for the UE when the cell group of the secondary node fails, in one example configuration.

FIG. 1A depicts an example wireless communication network 100 in which an example UE 102 operates in dual connectivity (DC) with a base station operating as a master node (MN) 104 and another base station operating as a secondary node (SN) 106. The UE 102 implements the techniques of this disclosure to report SCG failures and measurement reports to the MN even when the SCG has been suspended, and the base station 104 implements the techniques of this disclosure to support a handover procedure when the SCG of the SN 106 has failed.

These and other related techniques are discussed below primarily with reference to a 5G communication that includes a 5G core network (5GC) and base stations that support a 5G NR radio access technology (RAT). However, at least some of these techniques also apply to other types of base stations, RATs, and core networks. Further, in the following description, the terms "carrier," "carrier frequency," and "cell" can be used interchangeably.

In an example implementation, the base stations 104 and 106 operate as 5G nodes B (gNBs). In a DC configuration, the gNBs 104 and 106 can operate as an MN and an SN, respectively, and thus the gNB 104 operates as a MgNB and the gNB 106 operates as an SgNB. The wireless communication network 100 in general can include any suitable number of base stations, including a base station 108 which is for example a gNB, or a next-generation evolved Node B (ng-eNB). In the discussion that follows, base station 108 may be referred to as "gNB 108" or as "gNB/ng-eNB 108" to indicate that, in the implementation under discussion, base station 108 is a gNB, or base station 108 can alternatively be a gNB or an ng-eNB, respectively. Each of the base stations 104, 106, and 108 is connected to a 5GC 110. The gNBs and the ng-eNBs in the wireless communication network 100 can use an NG interface to exchange messages with the 5GC 110, and an Xn interface to directly (i.e., without using the 5GC 110) exchange messages with other gNBs or ng-eNBs.

The wireless communication network 100 in some cases can include an evolved packet core (EPC) 120 and one or more eNBs including an eNB 122. The eNBs in the wireless communication network 100 can use an S1 interface to exchange messages with the EPC 120, and an X2 interface to directly (i.e., without using the EPC 120) exchange messages with other eNBs.

The MgNB 104 covers an MCG 124 made up of one or more cells, and the SgNB 106 covers an SCG 126 made up of one more cells. In this example configuration, the MCG 124 includes at least cells 124A and 124B. The base station 108 can cover a cell 128 and, in some cases, one or more additional cells. The MCG 124, the SCG 126, and the cell 128 can have a certain geographic overlap so that the UE 102 at some point can generate measurement reports for at least one carrier for each of the MCG 124, the SCG 126, and the cell 128. The eNB 122 can cover a cell 136 and, in some cases, one or more additional cells. The MCG 124, the SCG 126, and the cell 136 can have a certain geographic overlap so that the UE 102 at some point can generate measurement reports for at least one carrier for each of the MCG 124, the SCG 126, and the cell 136.

The MgNB 104 is equipped with processing hardware that can implement an HO controller 132 and an RRC entity 134. In operation, the HO controller 132 can determine whether a handover procedure should proceed after the UE 102 has reported SCG failure. The RRC entity 134 can generate corresponding downlink RRC messages for the UE 102 (and/or other devices operating in the MCG 124) and process uplink RRC messages from the UE 102.

In other implementations, one or more of the base stations 104, 106, and 108 can be implemented as an eNB or an ng-eNB to support a EUTRA radio interface in the corresponding cells. The base station 104 accordingly can operate as a master eNB, a master ng-eNB or a master gNB, and/or the base station 106 can operate as a secondary eNB, a secondary ng-eNB or a secondary gNB.

Figure 1B:
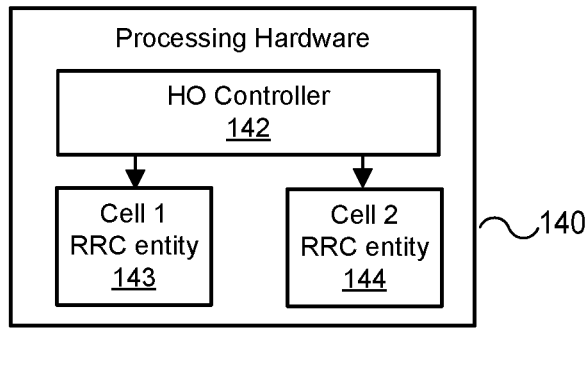
FIG. 1B is a block diagram of the base station of FIG. 1A in another example configuration.

FIG. 1B illustrates an example implementation of processing hardware 140 which the MgNB 104 can include. In this configuration, an HO controller 142 interacts with multiple radio resource control RRC entities (or modules) 143, 144, each responsible for a respective cell. The HO controller 142 can be implemented similar to the HO controller 132 depicted in FIG. 1A, and the RRC entities 143, 144 can be similar to the RRC entity 134 of FIG. 1A. In other implementations, however, a single RRC entity supports multiple cells of the base station.

Figure 1D:
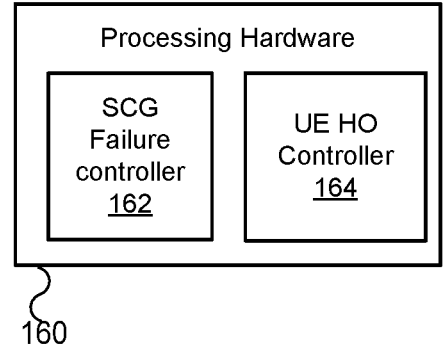
FIG. 1D is a block diagram of the UE of FIG. 1A in an example configuration.
Figure 1C:
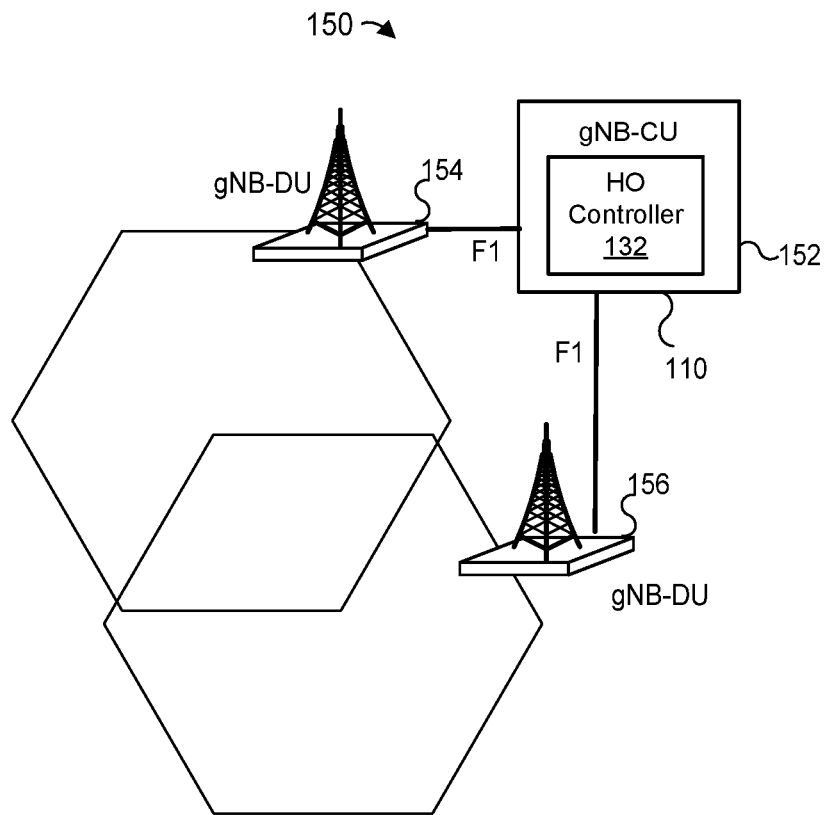
FIG. 1C is a block of the base station of FIG. 1 in another example configuration.

FIG. 1C an example disaggregated configuration 150 of the gNB 106. According to this configuration, a gNB central unit (gNB-CU) 152 implements the HO controller 132 and connects to gNB distributed units (gNB-DUs) 154 and 156 via F1 interface links. In general, the gNB-CU 152 can support one, two, or more gNB-DUs. The gNB-DUs 154 and 156 in this implementation are sufficiently separated geographically to cover different cells, which may have a certain geographic overlap.

The gNB-CU 152 in this architecture is a logical node hosting RRC, Service Data Adaptation Protocol (SDAP) and Packet Data Convergence Protocol (PDCP) protocols of the gNB; and the gNB-DU 154 or 156 is a logical node hosting radio link control (RLC), medium access control (MAC) and physical (PHY) layers of the gNB 104. The gNB-CU 152 partly controls operation of the gNB-DUs 154 and 156. The UE 102 communicates with the gNB-DU 154 or 156 via a radio interface that conforms to the NR standard, and the gNB-DU 154/156 exchanges messages with the corresponding gNB 152.

As illustrated in FIG. 1D, the UE 102 in some implementations is equipped with processing hardware 160 which includes an SCG failure controller 162 and a UE HO controller 164. The SCG failure controller 162 can detect SCG failures, control DRB suspension, etc. The UE HO controller 164 can exchange messages with the radio access network (RAN) in which the gNBs 104, 106, and 108 operate and/or the 5GC 110 regarding handover procedures.

In the examples above, the processing hardware 130, 140, or 160 can include one or more general-purpose processors such as central processing units (CPUs) and non-transitory computer-readable memory storing machine-readable instructions executable on the one or more general-purpose processors. Additionally or alternatively, the processing hardware 130, 140, or 160 can include special-purpose processing units implemented in hardware, firmware, software, or any suitable combination of hardware, firmware, or software.

Several example scenarios according to which the UE 102 and the MgNB 106 can carry out procedures related to handover during an SCG failure are discussed next with reference to FIGS. 2-5.

Figure 2:
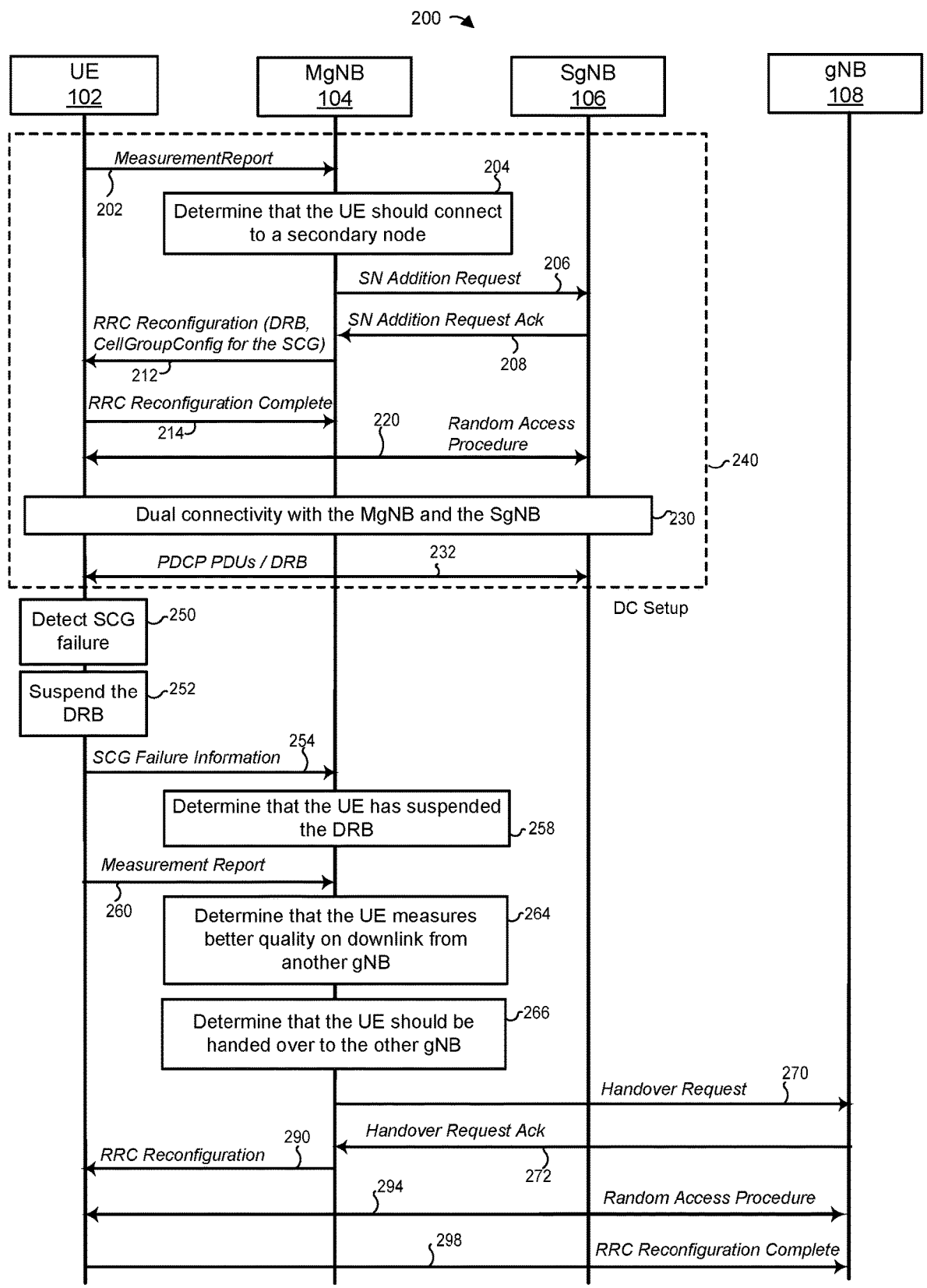
FIG. 2 is a messaging diagram of an example scenario in which a base station implemented as a master node determines that the UE has suspended a DRB and initiates a handover to another base station.

In a scenario 200 of FIG. 2, the gNB 104 can configure the UE 102 to generates at least one measurement result for a downlink (DL) carrier frequency of the gNB 106 (not shown in FIG. 2 to avoid clutter). The UE 102 generates the at least one measurement result and transmits 202 a Measurement Report message to the gNB 104, in accordance with this configuration. The Measurement Report message can indicate signal strength and/or signal quality on the DL carrier frequency of the gNB 106. The UE 102 also can send one or more instances of the Measurement Report message to the gNB 104.

Based on the received measurement report, the gNB 104 can determine 204 that the UE 102 should operate in DC, with the gNB 104 operating as an MgNB and the gNB 106 operating as an SN. The gNB 104 initiates an SN addition procedure with the gNB 106 to establish a context for the UE 102 at the gNB 106 and provide radio resources of the gNB 106 to the UE 102. In particular, the gNB 104 sends 206 an SN Addition Request message to the gNB 106. In response, the gNB 106 sends 208 an SN Addition Request Ack message to the gNB 104, and the gNBs 104 and 106 at this point are prepared operate as an MgNB and an SgNB, respectively. In some implementations, the SN Addition Request message is an S-Node Addition Request message, and the SN Addition Request Ack message is a S-Node Addition Request Acknowledge message.

The MgNB 104 configures 212 the UE 102 with a DRB for communicating with the SgNB 106 and provides a configuration for the SCG associated with the SgNB 106. To this end, the MgNB 104 sends to the UE 102 an RRC Reconfiguration message including a cell group configuration (CellGroupConfig) information element (IE) for the SCG and a configuration of a DRB (e.g., a Radio Bearer Configuration (RadioBearerConfig) IE or a DRB-ToAddMod IE) for the SCG (i.e., the DRB can be a split DRB or a SCG DRB). The UE 102 can transmit 214 an RRC Reconfiguration Complete message in response. In some implementations, the MgNB 104 receives the CellGroupConfig IE and the configuration of the DRB in the SN Addition Ack message if the DRB is a split DRB or a SCG DRB. That is, the SgNB 106 configures the DRB to the UE via the MgNB 104.

The UE 102 and the SgNB 106 then perform 220 a random access procedure, which can be any suitable random procedure that includes an exchange of two message, four messages, etc. Upon successfully completing the random access procedure, the UE 102 begins to operate 230 in DC with the MgNB 104 and the SgNB 106. Specifically regarding the SCG, the UE 102 and the SgNB 106 begin to exchange 232 PDCP PDUs over the DRB of the SCG. The events 202-232 collectively make up a DC setup procedure 240. In some implementations, the UE 102 performs the random access procedure according to the CellGroupConfig IE if the CellGroupConfig IE configures random access resources for the UE 102 to perform 220 the random access procedure. In other implementations, the UE 102 may skip the random access procedure if the CellGroupConfig IE configures the UE to do so. The UE skips the random access procedure accordingly.

At a later time and while operating in DC with the MgNB 104 and the SgNB 106, the UE 102 detects 250 SCG failure on a radio connection between the UE 102 and the SgNB 106. For example, the UE 102 can detect an SCG radio link failure (RLF), reconfiguration with sync failure, integrity check failure, or SCG configuration failure, on the radio connection to the SgNB 106. In response, the UE 102 suspends 252 the DRB.

The UE 102 also provides 254 an indication to the MgNB 104 that the SCG has failed. The UE 102 in some implementations sends an SCG Failure Information message to the MgNB 104. In some cases, the SCG Failure Information message (or another indication of the SCG failure) can include at least one measurement result (or report) indicating that the UE 102 measures a relatively low strength and/or quality on DL carrier frequency of the MgNB 104, and a relatively high strength and/or quality on a DL carrier frequency of the gNB/ng-eNB 108. The DL carrier frequency of the MgNB 104 and the DL carrier frequency of the gNB/ng-eNB 108 can be same or different. In some implementations, the at least one measurement result may include a physical cell identity (PCI), a synchronization signal block (SSB) index, a channel state information reference signal (CSI-RS) index, reference signal received power (RSRP), reference signal received quality (RSRQ), signal to interference and noise ratio (SINR) and/or an event identity (e.g., so-called events A3, A4 or A5) when the base station 108 is a gNB. When the base station 108 is an ng-eNB, the at least one measurement result may include a PCI, RSRP, RSRQ, and/or an event identity (e.g., so-called events B1 or B2).

After receiving an indication that the SCG has failed, the MgNB 104 determines 258 that the UE 102 has suspended the DRB.

As an alternative to including at least one measurement result for downlinks signals from the MgNB 104 and the gNB/ng-eNB 108 in an SCG Failure Information message, or in addition to doing so, the UE 102 can send 260 to the MgNB 104 a Measurement Report message including the at least one measurement result or similar measurement results, after reporting the SCG failure to the MgNB 104. The UE 102 also can send one or more instances of the Measurement Report message to the MgNB 104 prior to detecting the SCG failure. In some implementations, the UE 102 performs the measurements to get the at least measurement result in accordance with the configuration the MgNB 104 has provided.

The MgNB 104 determines 264 that the UE 102 measures better signal quality and/or strength on a downlink carrier of the gNB/ng-eNB 108 than in the cell of the MCG 124. The MgNB 104 then determines 266 that a handover to the gNB/ng-eNB 108 is desirable.

The MgNB 104 sends 270 a Handover Request message to the gNB/ng-eNB 108. The gNB/ng-eNB 108 can generate an RRC Reconfiguration message including a reconfigurationWithSync IE and encapsulate the RRC Reconfiguration message in a Handover Request Acknowledge message. The RRC Reconfiguration message indicates a cell in which the UE 102 should perform a random access procedure. The gNB/ng-eNB 108 then responds 272 with the Handover Request Acknowledge. The MgNB 104 then can forward 290 the RRC Reconfiguration message from the gNB/ng-eNB 108 to the UE 102, thereby instructing the UE 102 to hand over to the gNB/ng-eNB 108.

The UE 102 performs 294 a random access procedure in the cell specified in the RRC Reconfiguration message and, after completing this procedure successfully, the UE 102 sends 298 an RRC Reconfiguration Complete message to the gNB/ng-eNB 108. Thus, the MgNB 104 in this scenario coordinates a procedure to hand the UE 102 over to gNB/ng-eNB 108 even though the DRB associated with the SCG has been suspended. In some implementations, the gNB/ng-eNB 108 may configure random access resources in the RRC Reconfiguration message so that the UE 102 performs 294 the random access procedure according to the random access resources. If the gNB/ng-eNB 108 indicates that the UE 102 should skip the random access procedure in the RRC Reconfiguration message, the UE 102 does not perform 294 the random access procedure. For example, the gNB/ng-eNB 108 may not configure the random access resources in the RRC Reconfiguration message to indicate that the UE 102 should not perform the random access procedure.

The RRC Reconfiguration message may configure the DRB to be an MCG bearer. In some implementations, the UE 102 may resume the suspended DRB in response to the RRC Reconfiguration message. In other implementations, the UE may resume the suspended DRB in response to the random access procedure or after the random access procedure. When the DRB is resumed (i.e., not suspended), the UE 102 transmits to the gNB/ng-eNB 108 data associated with the suspended DRB after the RRC Reconfiguration Complete message or along with the RRC Reconfiguration Complete message.

Figure 3:
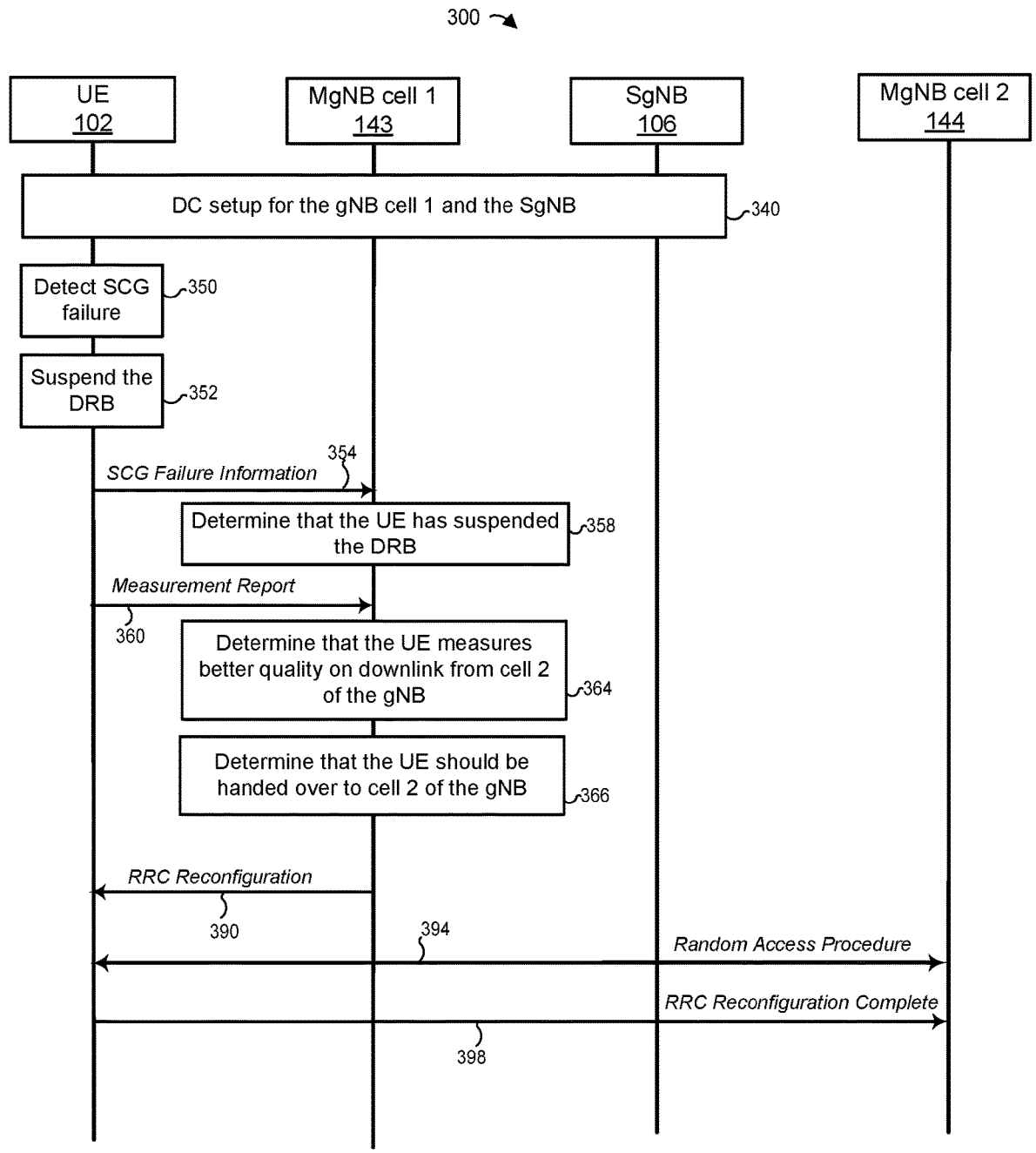
FIG. 3 is a messaging diagram of an example scenario in which a base station implemented as a master node determines that the UE has suspended a DRB and initiates a handover from one cell to another cell.

Next, FIG. 3 illustrates an example scenario 300 that is generally similar to the scenario 200 discussed above, except that here an MN, after determining that the UE has suspended a DRB which can be split DRB or a SCG DRB, initiates a handover from one cell to another cell. For clarity, FIG. 3 refers to two separate RRC entities or controllers in connection with the two cells; however, the gNB 104 in other implementations can rely on a single RRC entity for both cells.

The UE 102, the RRC entity 142 of the MgNB 104 (or simply, "MgNB cell 1"), and the SgNB 106 can set up 340 dual connectivity for the UE 102, similar to the procedure 240 of FIG. 2. When operating in DC, the UE 102 detects 350 SCG failure, suspends 352 the DRB, and provides 354 to the MgNB cell 1 an indication that the SCG has failed. The MgNB cell 1 determines 358 that the SCG has failed and the UE 102 suspended the DRB, based on the received indication. The events 350, 352, 354, and 358 are similar to the events 250, 252, 254, and 258, respectively.

The UE 102 sends 360 to the MgNB cell 1 a Measurement Report message prior to sending 354 an indication of SCG failure or after sending 354 the indication of SCG failure. The Measurement Report message and/or the SCG Failure Information message includes at least one downlink carrier measurement result. In this scenario, the at least one measurement result in the Measurement Report message or in the SCG Failure Information message can include one or more downlink carrier measurement results for another cell of the MgNB 104. For example, if the UE 102 operates in the cell 124A when setting up 340 dual connectivity with the MgNB cell 1 and the SgNB 106, the SCG Failure Information message or the Measurement Report can include at least one downlink carrier measurement result for the cell 124B. Depending on the configuration or scenario, downlink carrier frequencies in the cells 124A and 124B can be the same or different.

The MgNB cell 1 determines 364 that the UE 102 measures better signal quality and/or strength on a downlink carrier in another cell (e.g., the cell 124B) than in the current cell of the MgNB 104 in which the UE 102 operates (e.g., the cell 124A). The MgNB cell 1 then determines 366 that a handover to the new cell is desirable.

The MgNB cell 1 sends 390 an RRC Reconfiguration message to the UE 102. This message can include a reconfigurationWithSync IE and an indication of the target cell (i.e., the MgNB cell 2) to which the UE 102 should hand over. The UE 102 then performs 394 a random access procedure with the RRC entity 144 of the gNB 104 (or simply, "MgNB cell 2"). During the random access procedure, the UE 102 can send a random access preamble to the MgNB 104 via the cell 124B. After completing this procedure successfully, the UE 102 sends 398 an RRC Reconfiguration Complete message to the MgNB cell 2. In this manner, the MgNB 104 coordinates a handover of the UE 102 to a new cell even though the DRB associated with the SCG has been suspended. In some implementations, the MgNB 104 may configure random access resources in the RRC Reconfiguration message so that the UE 102 performs 394 the random access procedure according to the random access resources. If the MgNB 104 indicates the UE 102 to skip the random access procedure in the RRC Reconfiguration message, the UE 102 does not perform 394 the random access procedure. For example, the gNB 108 may not configure the random access resources in the RRC Reconfiguration message to indicate that the UE 102 should not perform the random access procedure.

The RRC Reconfiguration message may configure the DRB to be an MCG bearer. In some implementations, the UE 102 may resume the suspended DRB in response to the RRC Reconfiguration message. In other implementations, the UE may resume the suspended DRB in response to the random access procedure or after the random access procedure. When the DRB is resumed (i.e., not suspended), the UE 102 transmits the MgNB 104 data associated the suspended DRB after the RRC Reconfiguration Complete message or along with the RRC Reconfiguration Complete message.

Figure 4:
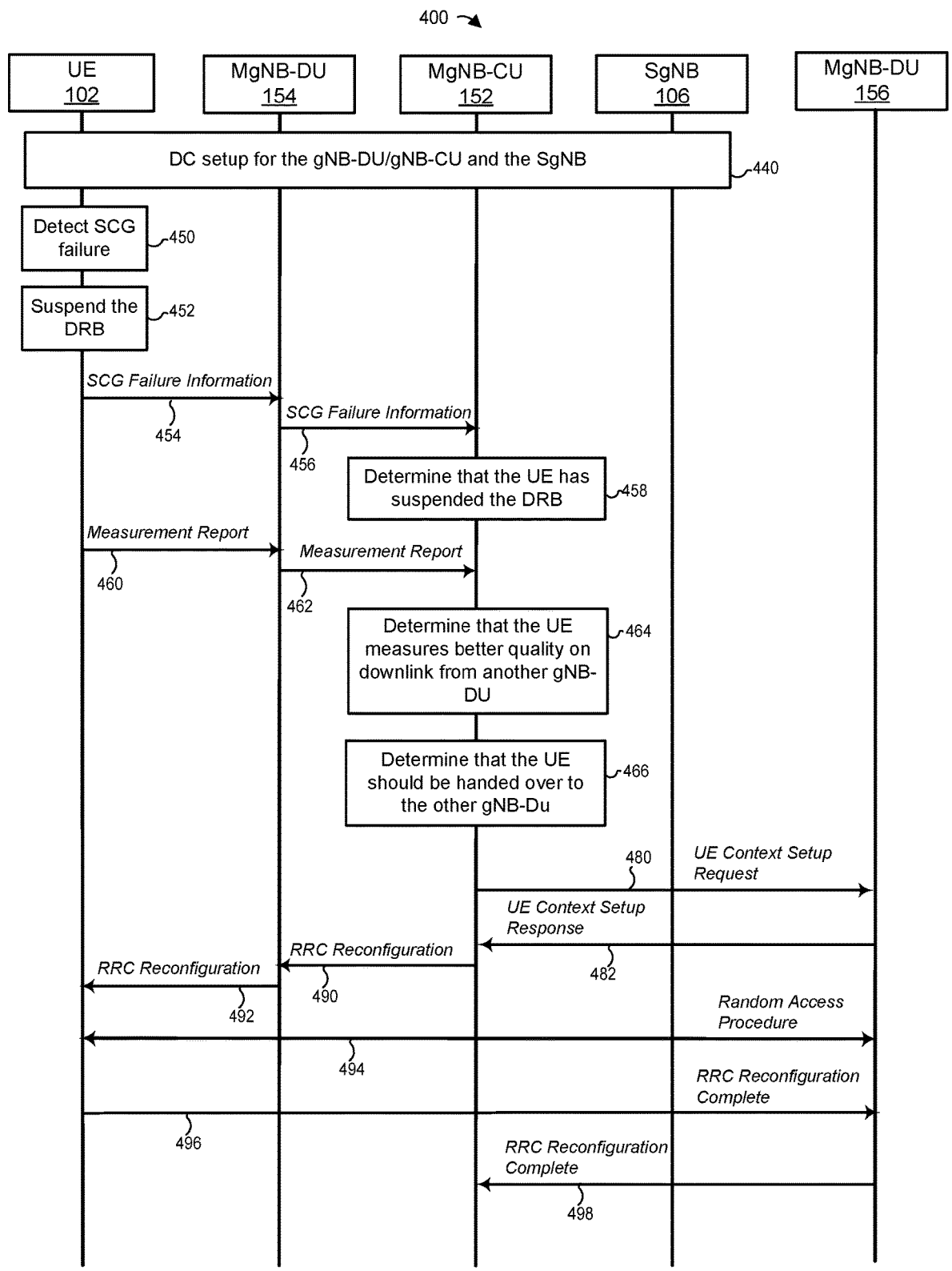
FIG. 4 is a messaging diagram of an example scenario in which a base station implemented according to disaggregated architecture determines that the UE has suspended a DRB and initiates a handover from one distributed unit to another distributed unit.

Next, FIG. 4 illustrates of an example scenario 400 in which the MgNB 104, implemented in a disaggregated mode as illustrated in FIG. 1C for example, initiates a handover from one distributed unit 154 of the MgNB 104 to another distributed unit 156 of the MgNB 104, after determining that the UE 102 has suspended a DRB.

In this scenario, the UE 102, the MgNB 104, and the SgNB 106 first set up 440 dual connectivity for the UE 102. This procedure is similar to the procedure 240 of FIG. 2, but because the MgNB 104 in this scenario is disaggregated, the UE 102 sends a Measurement Report message to the MgNB-CU 152 via the MgNB-DU 154. Also, in the downlink direction, the MgNB-CU 152 sends an RRC Reconfiguration message with the cell group and DRB configuration to the UE 102 via the MgNB-DU 154.

Similar to the events 250 and 252, the UE 102 detects 450 SCG failure and suspends 452 a DRB which can be a split DRB or a SCG DRB. The UE 102 then sends 454 an SCG Failure Information message to the MgNB-DU 154, which in turn sends 456 the SCG Failure Information message to the MgNB-CU 152. The SCG Failure Information message (or, in other implementations, another indication of the SCG failure the UE 102 sends to the MgNB-CU 154) can include at least one measurement result indicating that the UE 102 measures a relatively low strength and/or quality on DL carrier frequency of the MgNB-DU 154, and a relatively high strength and/or quality on a DL carrier frequency of the MgNB-DU 156. Depending on the configuration or scenario, the DL carrier frequencies in MgNB-DU 154 and MgNB-DU 156 can be the same or different. After receiving an indication that the SCG has failed, the MgNB-CU 152 determines 458 that the UE 102 has suspended the DRB.

As an alternative to including measurement results for downlinks signals from the MgNB-DU 154 and the MgNB-DU 156 in an SCG Failure Information message, or in addition the doing so, the UE 102 can send 460 to the MgNB-DU 154 a Measurement Report message including the at least one measurement result or similar measurement results to the MgNB-DU 154. The UE 102 sends one or more instances of the Measurement Report message to the MgNB-DU 154 prior to detecting the SCG failure, after detecting the SCG failure but prior to reporting the SCG failure, or after detecting and reporting the SCG failure. In some implementations, the UE 102 performs the measurements to get the at least measurement result in accordance with the configuration the MgNB-CU 152 has provided.

In any case, the MgNB-CU 152 determines 464 that the UE 102 measures better signal quality and/or strength on a downlink carrier of the MgNB-DU 156 than on downlink carrier of the MgNB-DU 154. In view of this determination, the MgNB-CU 152 then determines 466 that a handover to the MgNB-DU 156 is desirable.

The MgNB-CU 152 sends 480 a UE Context Setup Request message to the MgNB-DU 156. In response, the MgNB-DU 156 generates a CellGroupConfig IE including a reconfigurationWithSync IE. The CellGroupConfig IE indicates a cell in which the UE 102 should perform a random access procedure. The MgNB-DU 156 includes the CellGroupConfig IE in a UE Context Setup Response message and sends 482 the UE Context Setup Response message to the MgNB-CU 152.

The MgNB-CU 152 sends 492 to the UE 102 an RRC Reconfiguration message including the CellGroupConfig IE, via the MgNB-DU 154 (event 490). The MgNB-CU 152 thereby instructs the UE 102 to perform a handover to the MgNB-DU 156. More specifically, after receiving the RRC Reconfiguration message, the UE 102 performs 494 a random access procedure in the cell of the MgNB-DU 156 specified in the RRC Reconfiguration message and, after completing this procedure successfully, the UE 102 sends 496 an RRC Reconfiguration Complete message to the MgNB-DU 156 which the MgNB-DU 156 forwards 498 the RRC Reconfiguration Complete message to the MgNB-CU 152. Thus, the MgNB-CU 152 in this scenario coordinates a procedure to hand the UE 102 over from the MgNB-DU 154 to the MgNB-DU 156 even though the DRB associated with the SCG has been suspended. In some implementations, the MgNB-DU 156 may configure random access resources in the CellGroupConfig IE so that the UE 102 performs 294 the random access procedure according to the random access resources. If the MgNB-DU 156 indicates the UE 102 should not perform the random access procedure in the CellGroupConfig IE, the UE 102 does not perform 294 the random access procedure. For example, the MgNB-DU 156 may not configure the random access resources in the CellGroupConfig IE to indicate that the UE 102 should not perform the random access procedure.

The RRC Reconfiguration message may configure the DRB to be an MCG bearer. In some implementations, the UE 102 may resume the suspended DRB in response to the RRC Reconfiguration message. In other implementations, the UE may resume the suspended DRB in response to the random access procedure or after the random access procedure. When the DRB is resumed (i.e., not suspended), the UE 102 transmits the MgNB-DU 156 data associated the suspended DRB after the RRC Reconfiguration Complete message or along with the RRC Reconfiguration Complete message.

In some implementations, the MgNB-CU 152 also sends a UE Context Release Command message to the MgNB-DU 154 after sending the RRC Reconfiguration message to the UE 102 or after receiving the RRC Reconfiguration Complete message (not shown in FIG. 4 to avoid clutter). The MgNB-DU 154 releases the context of the UE 102 and/or the configuration of the UE 102 and sends a UE Context Release Complete message to the MgNB-DU 152, in response to the UE Context Release Command message.

Figure 5:
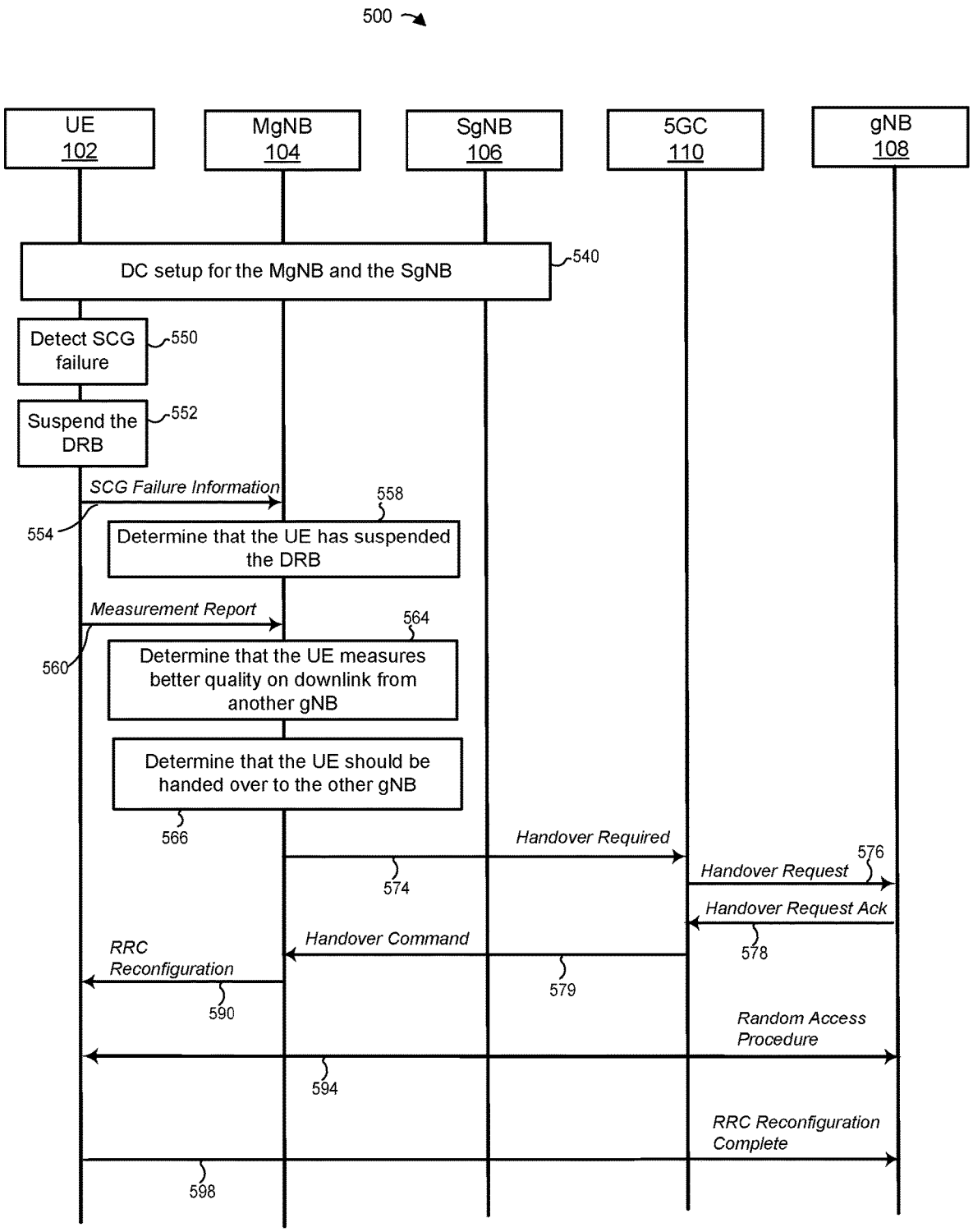
FIG. 5 is a messaging diagram of an example scenario in which a base station implemented as a master node determines that the UE has suspended a DRB and initiates a handover to another base station using the core network.

FIG. 5 illustrates an example scenario 500 that is generally similar to the scenario 200, in which the MgNB 104 determines that the UE 102 should perform a handover procedure to the gNB/ng-eNB 108, but here the MgNB 104 uses the 5GC 110.

The UE 102, the MgNB 104, and the SgNB 106 can set up 540 dual connectivity for the UE 102, similar to the procedure 240 of FIG. 2. When operating in DC, the UE 102 detects 550 SCG failure, suspends 552 the DRB which can be a split DRB or a SCG DRB, and provides 554 to the MgNB 104 an indication that the SCG has failed. The MgNB 104 determines 558 that the SCG has failed, based on the received indication. The UE 102 also can transmit 560 to the MgNB 104 one or more Measurement Reports, indicating the strength and/or quality of downlink carrier signals for the MgNB 104 and/or gNB/ng-eNB 108. The MgNB 104 determines 564 that the UE 102 measures better signal quality and/or strength on a downlink carrier frequency (or a cell) of the gNB 108 than in the cell of the MCG 124. The MgNB 104 then determines 566 that a handover to the gNB/ng-eNB 108 is desirable. The events 550, 552, 554, 558, 560, 564, and 566 are similar to the events 250, 252, 254, 258, 260, 264, and 266, respectively.

The MgNB 104 then sends 574 a Handover Required message to the 5GC 110. More particularly, the MgNB 104 can send the Handover Required message to the Access and Mobility Management Function (AMF) operating in the 5GC 110. In response, the 5GC 110 sends 576 a Handover Request message to the target gNB/ng-eNB 108.

The gNB/ng-eNB 108 generates a ReconfigurationWithSync IE, includes the ReconfigurationWithSync IE in an RRC Reconfiguration message, includes the RRC Reconfiguration message in a Handover Request Acknowledge message, and sends 578 the Handover Request Acknowledge message to the 5GC 110. The RRC Reconfiguration message includes an indication of a cell of the gNB/ng-eNB 108 on which the UE 102 should perform a random access procedure. The 5GC 110 extracts the RRC Reconfiguration message from the Handover Request Acknowledge message and includes the RRC Reconfiguration message in a Handover Command message. The 5GC 110 then sends 579 the Handover Command message to the MgNB 104. In response, the MgNB 104 sends 590 an RRC Reconfiguration message to the UE 102, thereby instructing the UE 102 to hand over to the gNB/ng-eNB 108.

The UE 102 performs 594 a random access procedure in the cell specified in the RRC Reconfiguration message and, after completing this procedure successfully, the UE 102 sends 598 an RRC Reconfiguration Complete message to the gNB 108. Thus, the MgNB 104 in this scenario coordinates a procedure to hand the UE 102 over to gNB/ng-eNB 108 even though the DRB associated with the SCG has been suspended. In some implementations, the gNB/ng-eNB 108 may configure random access resources in the RRC Reconfiguration message so that the UE 102 performs 594 the random access procedure according to the random access resources. If the gNB/ng-eNB 108 indicates that the UE 102 should not perform the random access procedure in the RRC Reconfiguration message, the UE 102 does not perform 594 the random access procedure. For example, the gNB/ng-eNB 108 may not configure the random access resources in the RRC Reconfiguration message to indicate that the UE 102 should not perform the random access procedure.

The RRC Reconfiguration message may configure the DRB to be an MCG bearer. In some implementations, the UE 102 may resume the suspended DRB in response to the RRC Reconfiguration message. In other implementations, the UE may resume the suspended DRB in response to the random access procedure or after the random access procedure. When the DRB is resumed (i.e., not suspended), the UE 102 transmits the gNB/ng-eNB 108 data associated the suspended DRB after the RRC Reconfiguration Complete message or along with the RRC Reconfiguration Complete message.

Figure 6:
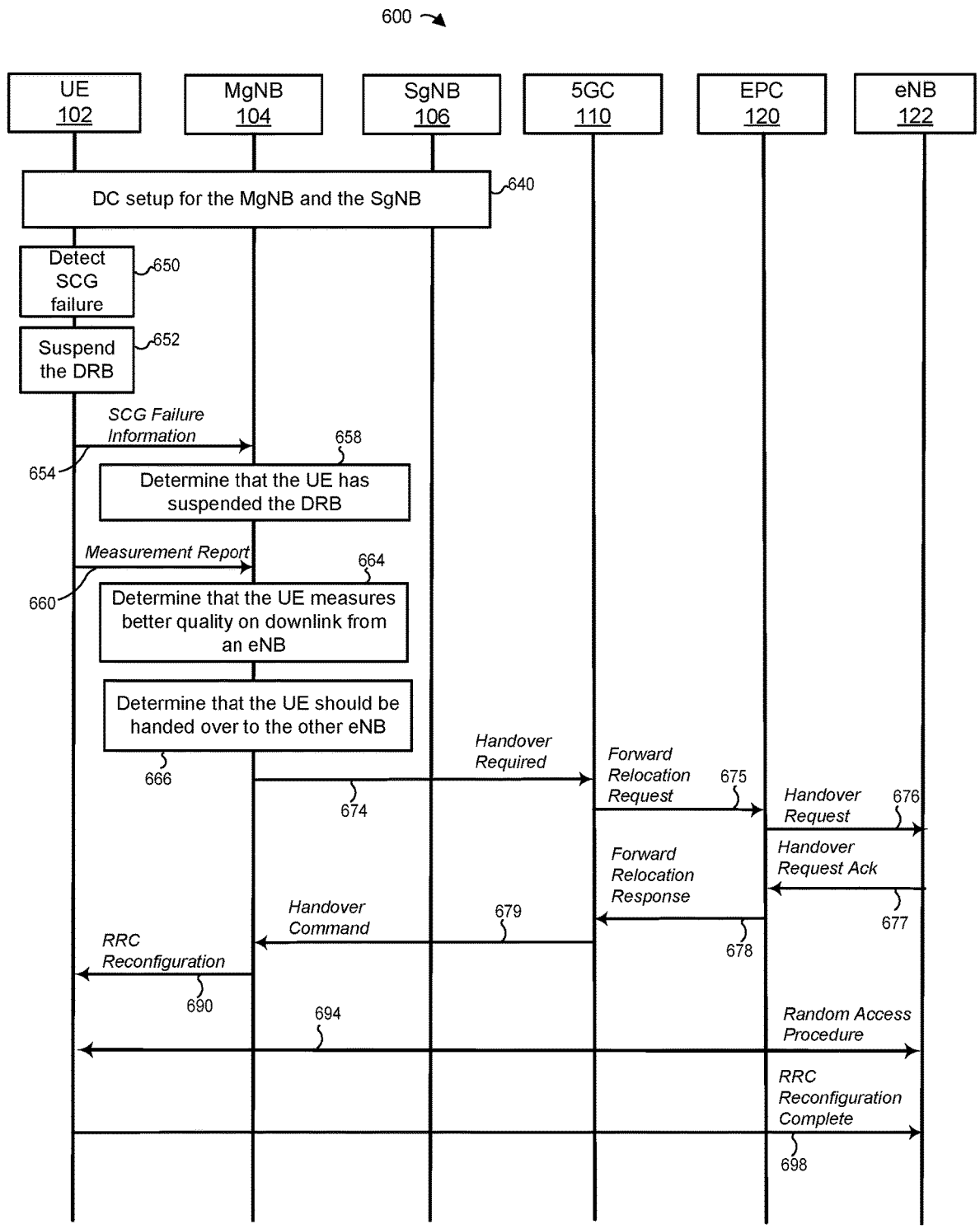
FIG. 6 is a messaging diagram of an example scenario in which a base station implemented as a master node determines that the UE has suspended a DRB and initiates a handover to another base station that operates according to a different RAT.

FIG. 6 illustrates an example scenario 600 that is generally similar to the scenario 200, in which the MgNB 104 determines that the UE 102 should perform a handover procedure to the eNB 122.

The UE 102, the MgNB 104, and the SgNB 106 can set up 640 dual connectivity for the UE 102, similar to the procedure 240 of FIG. 2. When operating in DC, the UE 102 detects 650 SCG failure, suspends 652 the DRB which can be a split DRB or a SCG DRB, and provides 654 to the MgNB 104 an indication that the SCG has failed. The MgNB 104 determines 658 that the SCG has failed, based on the received indication. The UE 102 also can transmit 660 to the MgNB 104 one or more Measurement Reports, indicating the strength and/or quality of downlink carrier signals for the MgNB 104 and/or the eNB 122. The MgNB 104 determines 664 that the UE 102 measures better signal quality and/or strength on a downlink carrier frequency (or a cell) of the eNB 122 than in the cell of the MCG 124. The MgNB 104 then determines 666 that a handover to the eNB 122 is desirable. The events 650, 652, 654, 658, 660, 664, and 666 are similar to the events 250, 252, 254, 258, 260, 264, and 266, respectively.

The MgNB 104 then sends 674 a Handover Required message to the 5GC 110. More particularly, the MgNB 104 can send the Handover Required message to the AMF operating in the 5GC 110. In response, the 5GC 110 sends 675 a Forward Relocation Request message to the EPC 120. The EPC 120 then sends 676 a Handover Request message to the target eNB 122.

The eNB 122 generates a MobilityControlInfo IE, includes the MobilityControlInfo IE in an RRC Connection Reconfiguration message, includes the RRC Connection Reconfiguration message in a Handover Request Acknowledge message, and sends 677 the Handover Request Acknowledge message to the EPC 120. The RRC Connection Reconfiguration message includes an indication of a cell of the eNB 122 on which the UE 102 should perform a random access procedure. The EPC 120 extracts the RRC Connection Reconfiguration message from the Handover Request Acknowledge message and includes the RRC Connection Reconfiguration message in a Forward Relocation Response message. The EPC 120 sends 678 the Forward Relocation Response message to the 5GC 110. The 5GC 110 extracts the RRC Connection Reconfiguration message from the Forward Relocation Response message and includes the RRC Connection Reconfiguration message in a Handover Command message. The 5GC 110 then sends 679 the Handover Command message to the MgNB 104. In response, the MgNB 104 sends 690 the RRC Connection Reconfiguration message to the UE 102, thereby instructing the UE 102 to hand over to the eNB 122. In some implementations of the event 690, the MgNB 104 includes the RRC Connection Reconfiguration message in a Mobility From NR Command message and sends the Mobility From NR Command message to the UE 102.

The UE 102 performs 694 a random access procedure in the cell specified in the RRC Connection Reconfiguration message and, after completing this procedure successfully, the UE 102 sends 698 an RRC Connection Reconfiguration Complete message to the eNB 122. Thus, the MgNB 104 in this scenario coordinates a procedure to hand the UE 102 over to the eNB 122 even though the DRB associated with the SCG has been suspended. In some implementations, the eNB 122 may configure random access resources in the RRC Connection Reconfiguration message, so that the UE 102 performs 694 the random access procedure according to the random access resources. If the eNB 122 indicates that the UE 102 should not perform the random access procedure in the RRC Connection Reconfiguration message, the UE 102 does not perform 694 the random access procedure. For example, the eNB 122 may not configure the random access resources in the RRC Connection Reconfiguration message to indicate that the UE 102 should not perform the random access procedure.

The RRC Connection Reconfiguration message the eNB 122 generates may configure a new DRB to replace the suspended DRB. The UE 102 replaces the suspended DRB with the new DRB in response to the RRC Connection Reconfiguration message. For example, the UE 102 can exchange data of an application (e.g., a web browser, a video streaming application, a messaging application, a social media application) over a certain DRB with the SgNB 106, before the handover. The UE 102 suspends the DRB in response to the SCG failure. Consequently, the UE 102 suspends exchanging data of the application. After the handover, the UE 102 exchanges data of the application over the new DRB with the eNB 122. In one implementation, the UE 102 uses the new DRB to exchange data with the eNB 122 in response to the RRC Connection Reconfiguration message. In other implementations, the UE 102 uses the new DRB to exchange data with the eNB 122 in response to the random access procedure, or after the random access procedure. When the UE 102 uses the new DRB in the implementations above, the UE 102 transmits to the eNB 122 data over the new DRB after the RRC Connection Reconfiguration Complete message, or along with the RRC Connection Reconfiguration Complete message. The UE 102 also releases the suspended DRB, i.e., the UE 102 no longer uses the DRB in response to the RRC Connection Reconfiguration message. The UE 102 resumes exchanging data of the application after the handover.

In some cases, the MgNB 104 may determine to initiate handover for the UE 102 because the 5GC 110 sent an appropriate request to an MgNB 104. For example, the 5GC 110 may request that the MgNB 104 hand over the UE 102 to E-UTRA for an Internet Protocol (IP) Multimedia Subsystem (IMS) service (e.g., voice call or video call). Then, the MgNB 104 determines to handover the UE 102 to the eNB 122 as described above.

Figure 7:
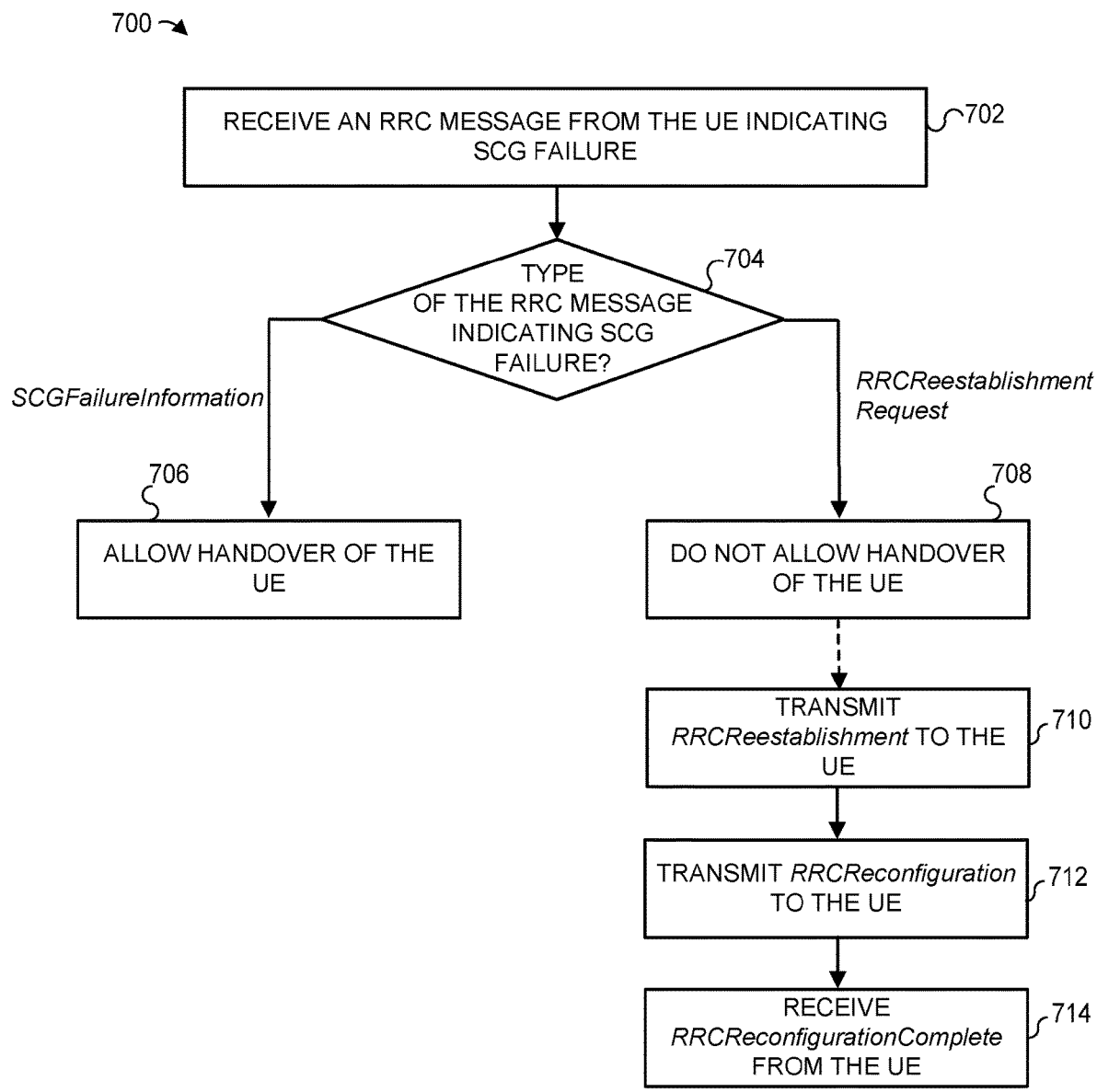
FIG. 7 is a flow diagram of an example method in a base station for determining whether the base station should allow a handover based on the type of the message that reports secondary cell group failure.
Figure 8:
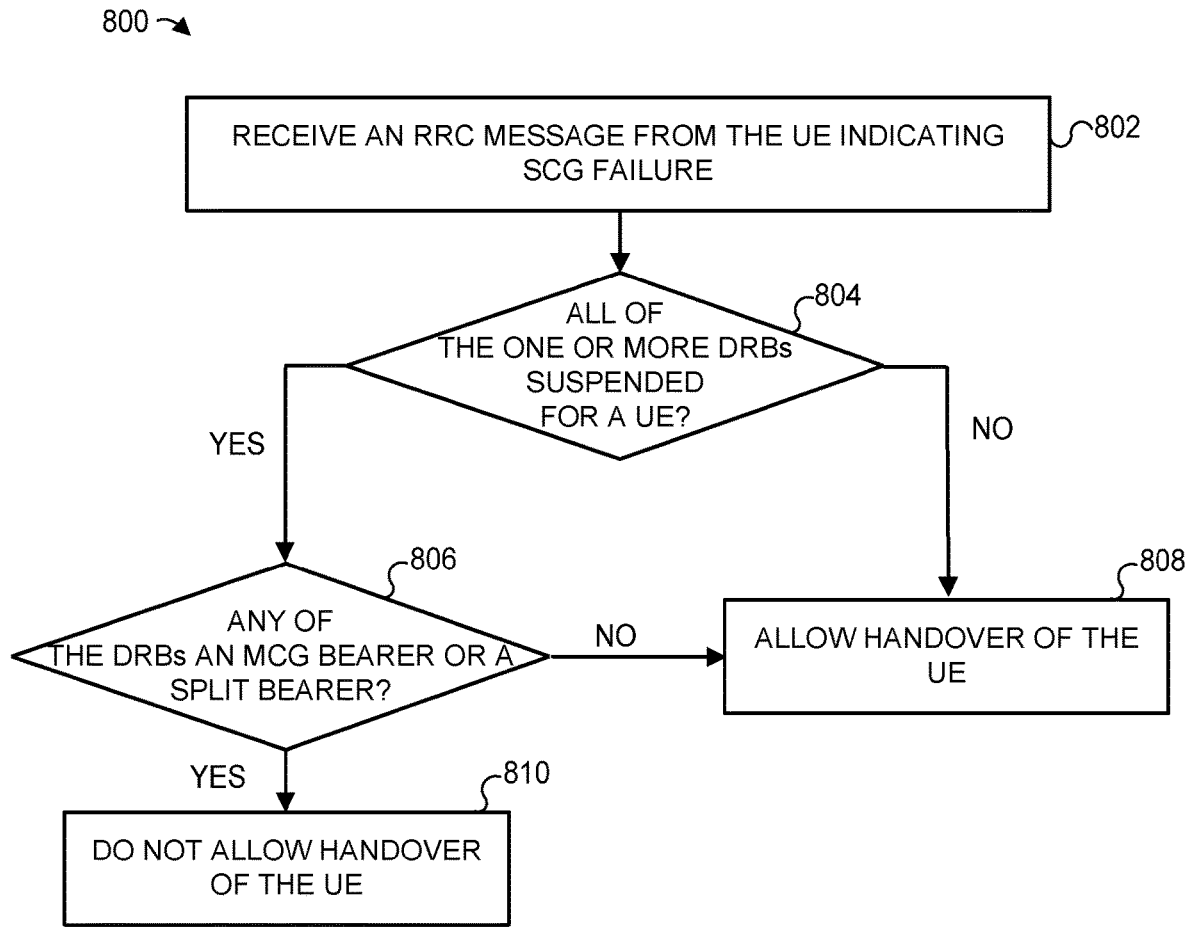
FIG. 8 is a flow diagram of an example method in a base station for determining whether the base station should allow a handover based on whether all of the DRBs of the UE are in a suspended state.
Figure 9:
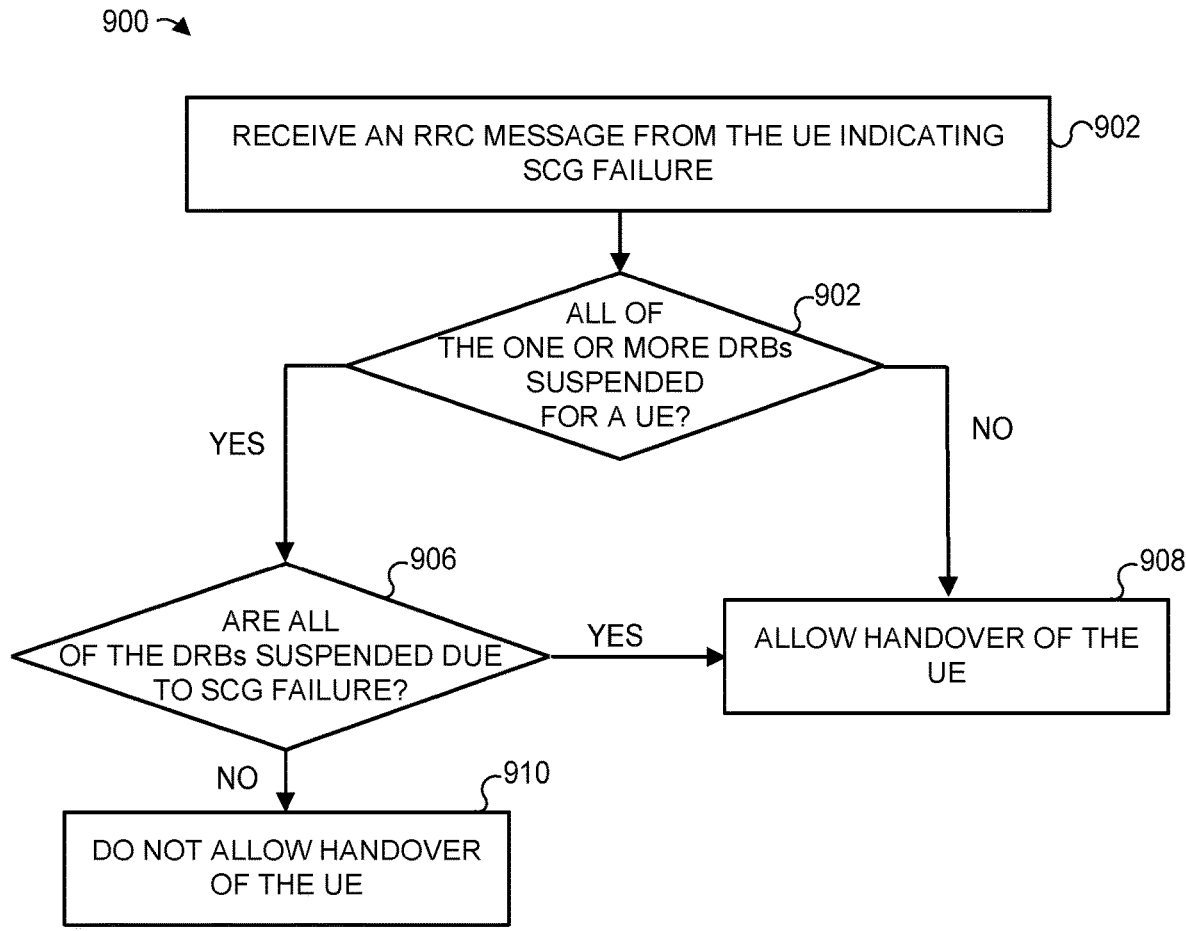
FIG. 9 is a flow diagram of an example method in a base station for determining whether the base station should allow a handover based on the reason why DRBs are in a suspended state.

Next, FIGS. 7-9 illustrate several example methods that can be implemented in a base station to support the scenarios above, in accordance with certain conditions. The discussion below references the base station 104 which, as discussed above, can be a gNB, an ng-eNB, or eNB, for example. More generally, these methods can be implemented in any suitable base station.

Referring first to FIG. 7, a method 700 for determining whether the base station should allow a handover based on the type of a message the UE uses to report failure can be implemented in the base station 104 of FIG. 1, for example. More particularly, the base station 104 can implement the method 700 for a handover between base stations, between cells of the same base station, or between distributed units coupled to the same central unit.

At block 702, the base station 104 receives, from the UE 102, an indication of failure (i.e., MCG failure or SCG failure). In some scenarios, the UE 102 reports the SCG failure to the base station 104 using the SCG Failure Information message (see for example the events 254, 354, 454, and 554 above). In other scenarios, the UE 102 can report the MCG failure to the gNB 104 using an RRC Reestablishment Request message. The UE 102 can use different mechanisms to transmit the SCG Failure Information and RRC Reestablishment Request messages. In particular, the UE 102 can transmit the SCG Failure Information message over an SRB1 established between the UE 102 and the base station 104, and transmit the RRC Reestablishment Request message over an SRB0 established between the UE 102 and the base station 104. Further, the UE 102 can transmit the SCG Failure Information message without first perform a random access procedure, but the UE 102 performs a random access procedure in order to transmit the RRC Reestablishment Request message.

Next, at block 704, the base station 104 determines whether the message that indicates failure is SCG Failure Information or RRC Reestablishment Request. If the message is SCG Failure Information, the flow proceeds to block 706, and the base station 104 determines that a handover for the UE 102 is allowed. As discussed above, the base station 104 in various scenarios sends a Handover Request message to the base station 108 (see FIG. 2) or a Handover Required message to the 5GC 110 (see FIG. 5, FIG. 6), sends an RRC Reconfiguration to the UE 102 (see FIG. 3), or sends a UE Context Setup Request from the CU to a DU (see FIG. 4).

Otherwise, if the message is RRC Reestablishment Request, the flow proceeds to block 708, and the base station 104 determines that the handover for the UE 102 is not allowed at this time.

Optionally, the flow further proceeds from block 708 to block 710, where base station 104 transmits an RRC Reestablishment message to the UE 102. The base station 104 transmits an RRC Reconfiguration message to the UE 102, at block 712. The base station 104 does not include a reconfigurationWithSync IE in the RRC Reconfiguration message because the base station 104 determined at block 708 that the UE 102 is not allowed to hand over to another cell or another DU. The UE 102 resumes the suspended DRB and SRB2 (and, some cases, other configured but suspended DRBs). Then, at block 714, the base station 104 receives an RRC Reconfiguration Complete message from the UE 102. The base station 104 accordingly becomes aware that the UE 102 has resumed the DRB(s) and the SRB2. In some implementations, the base station 104 transmits RRC Reconfiguration message to the UE 102 prior to receiving from the UE an RRC Reestablishment Complete message in response to the RRC Reestablishment message. In another implementation, the base station 104 does not transmit RRC Reconfiguration message to the UE 102 prior to receiving the RRC Reestablishment Complete message, and transmits the RRC Reconfiguration message to the UE 102 only after receiving RRC Reestablishment Complete.

FIG. 8 illustrates an example method 800 for determining whether a base station should allow a handover based on whether all of the DRBs of a UE are in a suspended state, which also can be implemented in the base station 104. The base station 104 can execute the method 800 for handovers to another base station, another cell of the same base station, or between DUs of the same disaggregated base station.

At block 802, the base station 104 receives an RRC message from the UE indicating SCG failure. The RRC message can be for example SCG Failure Information (see for example the events 254, 354, 454, 554, and 654 above).

At block 804, the base station 104 determines whether all of the DRBs configured for the UE are suspended. If the base station 104 determines that all of the DRBs of the UE are suspended, the flow proceeds to block 806. Otherwise, in response to determining that not all of the DRBs of the UE are suspended, the flow proceeds to block 808, and the base station 104 determines that the UE 102 is allowed to hand over to another base station and/or cell, or another DU.

At block 806, the UE 806 further checks whether any of the suspended DRBs corresponds to an MCG bearer or a split bearer (i.e., a bearer associated with the MCG as well as the SCG). When the base station determines that none of the suspended DRBs is an MCG bearer or a split bearer, the flow proceeds to block 808. Otherwise, when the suspended DRBs include an MCG bearer or a split bearer, the flow proceeds to block 810, and the base station 104 determines that a handover for the UE 102 is not allowed. In some implementations, the split bearer terminates at the MCG (i.e., PDCP of the split bearer at a MN) instead of the SCG (i.e., PDCP of the split bearer at a SN).

Next, FIG. 9 illustrates an example method 900 for determining whether the base station should allow a handover based on the reason why DRBs are in a suspended state, which also can be implemented in the base station 104.

At block 902, the base station 104 receives an RRC message from the UE indicating SCG failure. The RRC message can be for example SCG Failure Information (see for example the events 254, 354, 454, 554, and 654 above).

At block 904, the base station 104 determines whether all of the DRBs configured for the UE are suspended, similar to block 804 discussed above. If the base station 104 determines that all of the DRBs of the UE are suspended, the flow proceeds to block 906. Otherwise, in response to determining that not all of the DRBs of the UE are suspended, the flow proceeds to block 908, and the base station 104 determines that the UE 102 is allowed to hand over to another base station and/or cell, or another DU.

At block 906, the base station 104 determines whether the reason for suspending the DRBs for the UE 102 is SCG failure. If all of the DRBs are suspended due to the SCG failure, the flow proceeds to block 908, and the base station 104 determines that the UE 102 is allowed to hand over to another base station and/or cell, or another DU. Otherwise, the flow proceeds to block 910, where the base station 104 determines that the UE 102 is not allowed to hand over to another base station and/or cell, or another DU.

In some situations, the base station 104 can implement more than one of the methods 700, 800, and 900, or implement a combination of these methods. For example, the base station can allow a handover if all of the conditions of blocks 704, 804, and 904 are satisfied.

Figure 10:
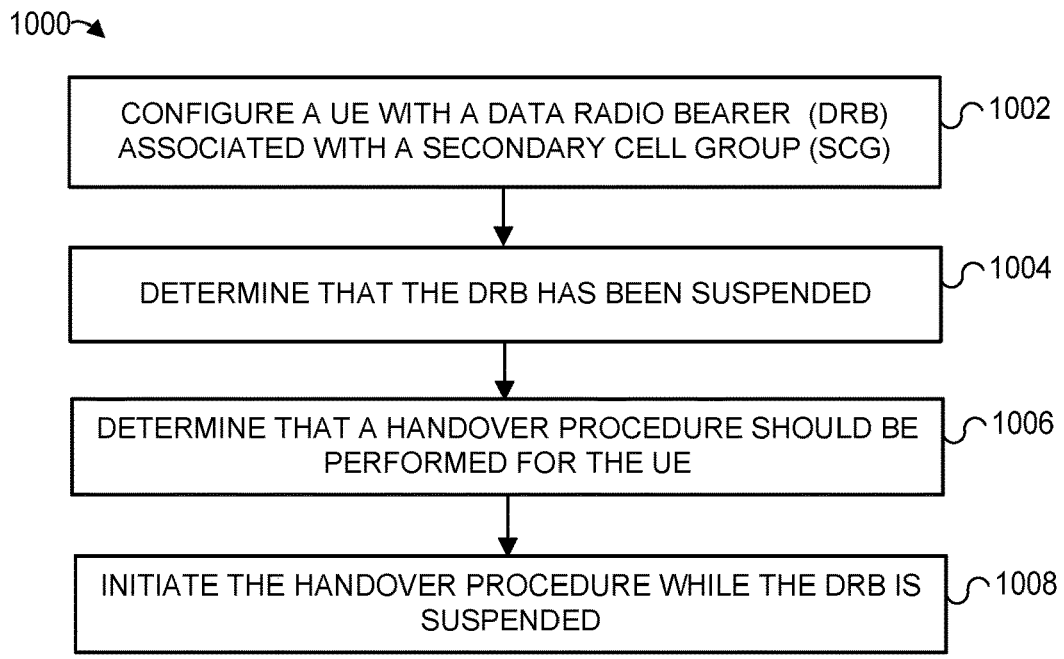
FIG. 10 is a flow diagram of an example method in a base station for initiating a handover of a UE following a secondary cell group failure.

FIG. 10 is a flow diagram of an example method 1000 for initiating a handover of a UE following an SCG failure, which can be implemented in the base station 104.

At block 1002, the base station 104 configures the UE 102 with a DRB associated with an SCG (e.g., event 212 of FIG. 2, procedure 340 of FIG. 3, procedure 440 of FIG. 4, procedure 540 of FIG. 5, procedure 640 of FIG. 6). At block 1004, the base station 104 determines that the DRB is suspended (e.g., event 258 of FIG. 2, event 358 of FIG. 3, event 458 of FIG. 4, event 558 of FIG. 5, event 658 of FIG. 6). The base station 104 can make this determination based on an indication of SCG failure (e.g., event 254 of FIG. 2, event 354 of FIG. 3, event 454 of FIG. 4, event 554 of FIG. 5, event 654 of FIG. 6).

At block 1006, the base station 104 determines that the UE 102 and/or one or more components of RAN or the GCC 110 should perform a handover procedure involving the UE 102 (e.g., event 266 of FIG. 2, event 356 of FIG. 3, event 456 of FIG. 4, event 558 of FIG. 5, event 658 of FIG. 6). The base station 104 can make this determination based at least in part on the quality and/or strength of signals on the downlink carriers of the current cell of the UE and a different cell in which the UE 102 can perform measurements (e.g., event 264 of FIG. 2, event 364 of FIG. 3, event 464 of FIG. 4, event 564 of FIG. 5, event 664 of FIG. 6). The base station 104 then initiates 1008 the handover procedure when the DRB is suspended (e.g., event 270 of FIG. 2, event 390 of FIG. 3, event 480 of FIG. 4, event 574 of FIG. 5, event 674 of FIG. 6).

Figure 11:
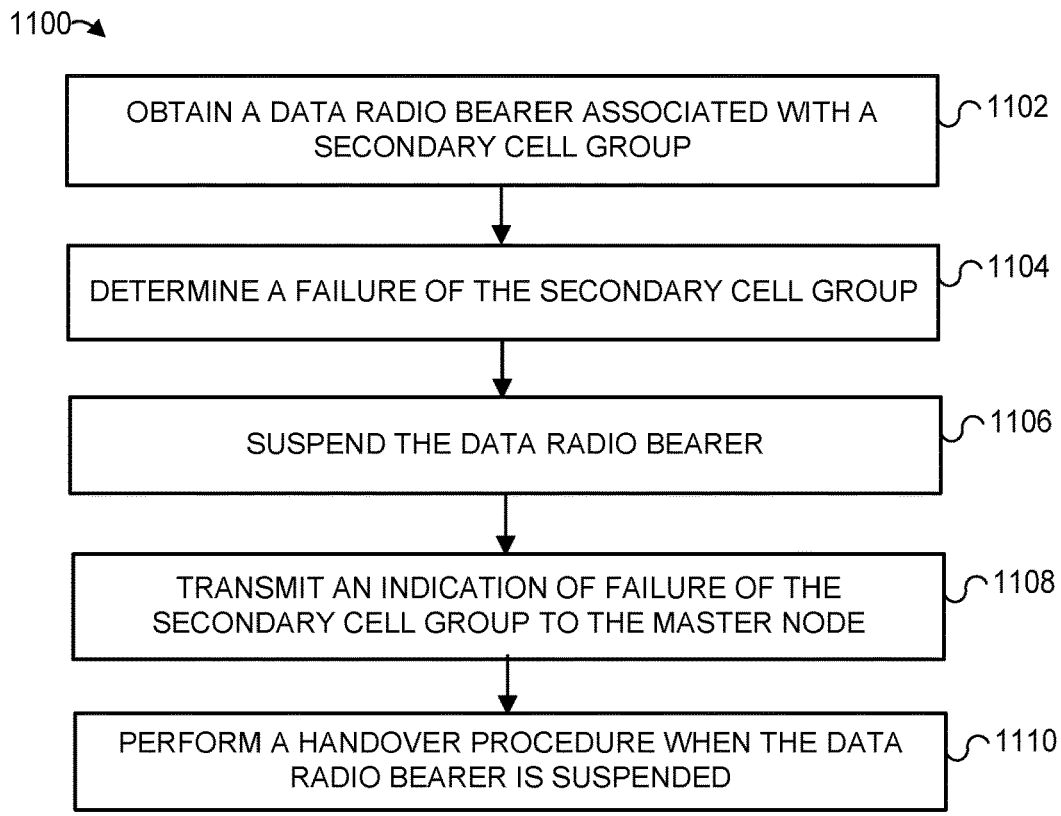
FIG. 11 is a flow diagram of an example method in a UE for performing a handover procedure following a secondary cell group failure.

Next, FIG. 11 illustrates an example method 1100 for performing a handover procedure following an SCG failure, which can be implemented in the UE 102.

At block 1102, the UE 102 obtains a radio bearer associated with an SCG (e.g., event 212 of FIG. 2, procedure 340 of FIG. 3, procedure 440 of FIG. 4, procedure 540 of FIG. 5). At a later time, the UE 102 determines a failure of the SCG (block 1104) (e.g., event 250 of FIG. 2, event 350 of FIG. 3, event 450 of FIG. 4, event 550 of FIG. 5, event 650 of FIG. 6). The UE 102 then suspends the DRB, at block 1106 (e.g., event 252 of FIG. 2, event 352 of FIG. 3, event 452 of FIG. 4, event 552 of FIG. 5, event 652 of FIG. 6).

At block 1108, the UE 102 transmits an indication of failure of the SCG to the MN (e.g., event 254 of FIG. 2, event 354 of FIG. 3, event 454 of FIG. 4, event 554 of FIG. 5, event 654 of FIG. 6). At block 1110, the UE 102 performs a handover procedure when the DRB is suspended. To this end, the UE 102 receives an RRC Reconfiguration message (event 290 of FIG. 2, event 390 of FIG. 3, event 490 of FIG. 4, or event 590 of FIG. 5) or an RRC Connection Reconfiguration message (event 690 of FIG. 6). The RRC Reconfiguration message or the RRC Connection Reconfiguration message indicates a new cell of another base station (e.g., the gNB/ng-eNB 108 or the eNB 122), the same base station (e.g., the MgNB cell 2 of the RRC entity 144), or a different DU of the same base station (e.g., the MgNB-DU 156).

When the UE 102 receives the RRC Reconfiguration message or the RRC Connection Reconfiguration message indicating that the UE 102 should hand over to the new cell, the UE 102 can check whether the UE 102 previously suspended one or more DRBs in response to the failure of the MCG or the SCG. If the UE 102 suspended the one or more DRBs due to an MCG failure, the UE 102 in one implementation ignores the RRC Reconfiguration message, the RRC Connection Reconfiguration message, or the Mobility From NR Command message. and performs an RRC reestablishment procedure. Otherwise, the UE 102 performs handover to the new cell according to the RRC Reconfiguration message or the RRC Connection Reconfiguration message.

The UE 102 then performs a random access procedure on this new cell (e.g., procedure 292 of FIG. 2, procedure 394 of FIG. 3, procedure 494 of FIG. 4, procedure 594 of FIG. 5, procedure 694 of FIG. 6). During this procedure, the UE 102 transmits a random access preamble on the new cell and receives a random access response on the new cell. The response includes an uplink grant. The UE 102 then transmits an RRC Reconfiguration Complete message to the base station on the new cell (e.g., event 298 of FIG. 2, event 398 of FIG. 3, events 496, 498 of FIG. 4, event 598 of FIG. 5) or an RRC Connection Reconfiguration message (e.g., event 698 of FIG. 6). Thus, rather than determining that the RRC Reconfiguration message is invalid due to the suspension of the DRB, the UE 102 according to the method 1100 hands over to the new cell.

Further, as discussed above, the UE 102 in some cases performs an RRC reestablishment procedure by sending an RRC Reestablishment Request message. The UE 102 then receives an RRC Reestablishment message in response and sends an RRC Reestablishment Complete message in response. As another example, the UE 102 can receive an RRC Setup message in response to the RRC Reestablishment Request message and, in response, sends an RRC Setup Compete message.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also have programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling SCG failures in DC through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method in a base station operating as a master node (MN) for performing a handover procedure comprises: configuring, by processing hardware, a UE that operates in dual connectivity (DC) with the MN and a secondary node (SN) with a data radio bearer (DRB) associated with a secondary cell group (SCG) of the SN; determining, by the processing hardware, that the DRB has been suspended; determining, by the processing hardware, that a handover procedure should be performed for the UE; and initiating, by the processing hardware, the handover procedure when the DRB is suspended.

Aspect 2. The method of aspect 1, wherein determining that the DRB has been suspended includes receiving an indication of failure of the SCG from the UE.

Aspect 3. The method of aspect 2, further comprising: in a first instance: receiving the indication of failure of the SCG in a dedicated message for reporting SCG failure, associated with a protocol for controlling radio resources, and determining that the handover procedure is allowed; and in a second instance: receiving the indication of failure of the SCG in a message for reconfiguring a radio connection, associated with the protocol for controlling radio resources, and determining that the handover procedure is not allowed.

Aspect 4. The method of aspect 3, further comprising, in the second instance, subsequently to determining that the handover procedure is not allowed: transmitting to the UE a command to resume the suspended DRB; and in response to receiving an indication that the UE has resumed the suspended DRB, determining that the handover procedure is not allowed.

Aspect 5. The method of aspect 1, further comprising: determining whether all of one or more DRBs with which the UE is configured are suspended; and when not all of the one or more DRBs are suspended, determining that the handover procedure is allowed.

Aspect 6. The method of aspect 5, further comprising: when all of the one or more DRBs are suspended, determining whether at least one of the one or more DRBs is a master cell group (MCG) DRB or a split DRB; and when at least one of the one or more DRBs is an MCG DRB or a split DRB, determining that the handover procedure is not allowed.

Aspect 7. The method of aspect 5, further comprising: when all of the one or more DRBs are suspended, determining whether all of the one or more DRBs are suspended due to a failure of the SCG; and when all of the one or more DRBs are suspended due to the failure of the SCG, determining that the handover procedure is allowed.

Aspect 8. The method of aspect 1, further comprising: receiving, by the processing hardware, signal measurement data for (i) a downlink carrier frequency on which the UE currently operates and (ii) a downlink carrier frequency to which the UE can be handed over; wherein determining that the handover procedure should be performed is based on the signal measurement data.

Aspect 9. The method of aspect 8, wherein the signal measurement data is included in an indication of failure of the SCG received from the UE.

Aspect 10. The method of aspect 8, wherein: determining that the DRB has been suspended includes receiving an indication of failure of the SCG from the UE, and the signal measurement data is received in a measurement report, prior to the indication of failure of the SCG.

Aspect 11. The method of aspect 8, wherein: determining that the DRB has been suspended includes receiving an indication of failure of the SCG from the UE, and the signal measurement data is received in a measurement report, subsequently to the indication of failure of the SCG.

Aspect 12. The method of aspect 1, wherein the base station is a first base station, and wherein initiating the handover procedure includes: transmitting a handover request to a second base station, receiving, from the second base station, an acknowledgement of the handover request; and transmitting to the UE a command to hand over to the second base station.

Aspect 13. The method of aspect 1, wherein the base station is a first base station, and wherein initiating the handover procedure includes: transmitting to a core network (CN) an indication that a handover to a second base station is required.

Aspect 14. The method of aspect 13, further comprising: receiving, from the CN, a handover command; and transmitting to the UE a command to hand over to the second base station.

Aspect 15. The method of aspect 14, wherein the second base station supports a different radio access technology (RAT) than the first base station.

Aspect 16. The method of aspect 1, wherein initiating the handover procedure includes: handing over the UE from a cell of the base station to a second cell of the base station.

Aspect 17. The method of aspect 16, wherein handing over the UE includes: transmitting to the UE a message associated with a protocol for controlling radio resources, the message including a reconfiguration with synchronization information element (IE).

Aspect 18. The method of aspect 1, wherein initiating the handover procedure includes handing over the UE from a first distributed unit (DU) of the base station to a second DU of the base station.

Aspect 19. The method of aspect 18, wherein handing over the UE includes: transmitting to the UE a reconfiguration command associated with a protocol for controlling radio resources, the message including a cell group configuration.

Aspect 20. A base station including processing hardware and configured to implement a method according to any of the preceding aspects.

Aspect 21. A method in a UE operating in dual connectivity (DC) with a master node (MN) and a secondary node (SN) for performing a handover procedure, the method comprising: obtaining, by processing hardware, a data radio bearer (DRB) associated with a secondary cell group (SCG) of the SN; determining, by the processing hardware, a failure of the SCG; in response to the failure, suspending, by the processing, the DRB; transmitting, by the processing hardware, an indication of the failure to the MN; and performing, by the processing hardware, a handover procedure when the DRB is suspended.

Aspect 22. The method of aspect 21, wherein transmitting the indication of the failure to the MN includes transmitting a dedicated message for reporting SCG failure, associated with a protocol for controlling radio resources.

Aspect 23. The method of aspect 21, further comprising: generating, by the processing hardware, signal measurement data in (i) a cell in which the UE currently operates and (ii) a cell to which the UE can hand over; and transmitting, by the processing hardware, the signal measurement data to the MN.

Aspect 24. The method of aspect 23, wherein the cell to which the UE can hand over corresponds to a base station different from the MN.

Aspect 25. The method of aspect 23, wherein each of the cell in which the UE currently operates and the cell to which the UE can hand over correspond to the MN.

Aspect 26. The method of aspect 23, wherein: the MN is a disaggregated MN, the cell in which the UE currently operates corresponds to a first DU of the disaggregated MN, and the cell to which the UE can hand over corresponds to a second DU of the disaggregated MN.

Aspect 27. The method of aspect 21, further comprising: receiving an RRC Reconfiguration message indicating a new cell to which the UE is to hand over.

Aspect 28. A UE including processing hardware and configured to implement a method according to any of aspects 21-27.

What is claimed is:

1. A method in a base station operating as a master node (MN) for performing a handover procedure, the method comprising:
   configuring a user equipment (UE) that operates in dual connectivity (DC) with the MN and a secondary node (SN) with one or more data radio bearers (DRBs) associated with a secondary cell group (SCG) of the SN;
   in the event that all of the one or more DRBs are determined to be suspended due at least in part to a failure of the SCG, determining that a handover procedure should be performed for the UE; and
   initiating the handover procedure.

2. The method of claim 1, further comprising: receiving an indication of failure of the SCG from the UE.

3. The method of claim 2, further comprising:
   in a first instance:
      receiving the indication of failure of the SCG in a dedicated message for reporting SCG failure, associated with a protocol for controlling radio resources, and
      determining that the handover procedure is allowed; and
   in a second instance:
      receiving the indication of failure of the SCG in a message for reconfiguring a radio connection, associated with the protocol for controlling radio resources, and
      determining that the handover procedure is not allowed.

4. The method of claim 3, further comprising, in the second instance, subsequently to determining that the handover procedure is not allowed:
   transmitting to the UE a command to resume the suspended DRB; and
   in response to receiving an indication that the UE has resumed the suspended DRB, determining that the handover procedure is not allowed.

5. The method of claim 1, further comprising:
receiving signal measurement data for (i) a downlink carrier frequency on which the UE currently operates and (ii) a downlink carrier frequency to which the UE can be handed over;
wherein determining that the handover procedure should be performed is based on the signal measurement data.

6. The method of claim 1, wherein the base station is a first base station, and wherein initiating the handover procedure includes:
transmitting a handover request to a second base station,
receiving, from the second base station, an acknowledgement of the handover request; and
transmitting to the UE a command to hand over to the second base station.

7. The method of claim 1, wherein the base station is a first base station, and wherein initiating the handover procedure includes:
transmitting to a core network (CN) an indication that a handover to a second base station is required.

8. The method of claim 1, wherein initiating the handover procedure includes:
handing over the UE from a cell of the base station to a second cell of the base station.

9. The method of claim 1, wherein initiating the handover procedure includes handing over the UE from a first distributed unit (DU) of the base station to a second DU of the base station.

10. The method of claim 9, wherein handing over the UE includes:
transmitting to the UE a reconfiguration command associated with a protocol for controlling radio resources, the reconfiguration command including a cell group configuration.

11. A base station including processing hardware and configured to:
configure a user equipment (UE) that operates in dual connectivity (DC) with a master node (MN) and a secondary node (SN) with one or more data radio bearers (DRBs) associated with a secondary cell group (SCG) of the SN;
in the event that all of the one or more DRBs are determined to be suspended due at least in part to a failure of the SCG, determine that a handover procedure should be performed for the UE; and
initiate the handover procedure.

12. A method in a user equipment (UE) operating in dual connectivity (DC) with a master node (MN) and a secondary node (SN) for performing a handover procedure, the method comprising:
obtaining one or more data radio bearers (DRBs) associated with a secondary cell group (SCG) of the SN;
determining a failure of the SCG;
in response to the failure, suspending all of the one or more DRBs;
transmitting an indication of the failure to the MN; and
performing a handover procedure when all of the one or more DRBs are suspended.

13. The method of claim 12, wherein transmitting the indication of the failure to the MN includes transmitting a dedicated message for reporting SCG failure, associated with a protocol for controlling radio resources.

14. The method of claim 12, further comprising:
generating signal measurement data in (i) a cell in which the UE currently operates and (ii) a cell to which the UE can hand over; and
transmitting the signal measurement data to the MN.

15. The base station of claim 11, wherein to determine that the DRB has been suspended, the base station is configured to receive an indication of failure of the SCG from the UE.

16. The base station of claim 15, further configured to:
in a first instance: (i) receive the indication of failure of the SCG in a dedicated message for reporting SCG failure, associated with a protocol for controlling radio resources, and (ii) determine that the handover procedure is allowed; and
in a second instance: (i) receive the indication of failure of the SCG in a message for reconfiguring a radio connection, associated with the protocol for controlling radio resources, and (ii) determine that the handover procedure is not allowed.

17. The base station of claim 16, further configured to:
in the second instance, subsequently to determining that the handover procedure is not allowed:
transmit to the UE a command to resume the suspended DRB; and
in response to receiving an indication that the UE has resumed the suspended DRB, determine that the handover procedure is not allowed.

18. The base station of claim 11, further configured to:
determine whether all of one or more DRBs with which the UE is configured are suspended; and
when not all of the one or more DRBs are suspended, determine that the handover procedure is allowed.

19. The base station of claim 11, further configured to:
receive signal measurement data for (i) a downlink carrier frequency on which the UE currently operates and (ii) a downlink carrier frequency to which the UE can be handed over;
wherein determining that the handover procedure should be performed is based on the signal measurement data.

* * * * *